US006976860B1

(12) United States Patent
Su

(10) Patent No.: US 6,976,860 B1
(45) Date of Patent: Dec. 20, 2005

(54) CARD CONNECTOR WITH TWO-STAGE EJECTION MECHANISM AND CARD-RETAINING MECHANISM

(75) Inventor: Chia Sheng Su, Tucheng (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 11/060,438

(22) Filed: Feb. 18, 2005

(51) Int. Cl.[7] .............................................. H01R 13/62
(52) U.S. Cl. ........................ 439/159; 439/630; 439/607
(58) Field of Search .................................. 439/159, 630, 439/310, 333, 160, 328, 631–632, 157, 155, 439/607–610, 152

(56) References Cited

U.S. PATENT DOCUMENTS

| | | | | |
|---|---|---|---|---|
| 6,537,090 B2 * | 3/2003 | Ozawa | ........................ | 439/159 |
| 6,609,919 B2 * | 8/2003 | Ito et al. | ...................... | 439/159 |
| 6,655,973 B2 * | 12/2003 | Ji et al. | ........................ | 439/159 |
| 6,669,494 B2 * | 12/2003 | Abe | ............................. | 439/159 |
| 6,729,892 B2 * | 5/2004 | Takada et al. | .............. | 439/159 |
| 6,790,061 B1 * | 9/2004 | Lai et al. | ..................... | 343/159 |

\* cited by examiner

Primary Examiner—Tho D. Ta
Assistant Examiner—Edwin A. Leon
(74) Attorney, Agent, or Firm—Rosenberg, Klein & Lee

(57) ABSTRACT

The present invention provides a card connector with two-stage ejection mechanism and card-retaining mechanism. The card connector includes a plastic case body, a shielding case cover and a two-stage ejection mechanism assembled therebetween. The plastic case body has a heart-shaped cam groove for engagement with a pin member. The shielding case cover has a guiding groove. A flexural border is formed on one side of the side border of the guiding groove. The two-stage ejection mechanism includes a slider. The retaining elastic pin extends a retaining portion towards the memory card for engagement with a groove on one side of the memory card, so that the memory is stably and reliably retained and the card connector is compact and light-weight.

6 Claims, 4 Drawing Sheets

CARD CONNECTOR WITH TWO-STAGE EJECTION MECHANISM AND CARD-RETAINING MECHANISM

BACKGROUND OF THE INVENTION

1. Field of the Invention

The present invention relates generally to a card connector, and more specifically to a card connector with two-stage ejection mechanism and card-retaining mechanism, a memory card can be stably and reliably retained in the card connector.

2. The Related Art

Nowadays, with the development of Personal Computer and the related electronic products, many kinds of memory cards are widely applied, such as PCMCIA (Personal Computer Memory Card International Association) card, SD (Secure Digital) card and CF (Compact Flash) card. Accordingly, card connectors applied in such products appear. Especially, the card connector with two-stage ejection mechanism and card-retaining mechanism is widely applied.

U.S. Pat. No. 6,537,090 discloses a card connector with two-stage ejection mechanism and card-retaining mechanism. The card connector comprises a case cover, a plastic case for engagement with the case cover, a card detachable mechanism and a card-retaining mechanism. The card detachable mechanism and the card-retaining mechanism are installed between the case cover and the plastic case.

The card detachable mechanism disclosed in U.S. Pat. No. 6,537,090 comprises a repositioning spring, a slider, a pin member and a heart-shaped cam groove. The repositioning spring is clamped between the slider and the plastic case. The slider is smoothly engaged with one side of the plastic case. The heart-shaped cam groove is formed on the plastic case. One end of the pin member for engagement with the slider and the other end of the pin member is put into the heart-shaped cam groove. The other end of the pin member moves back and forth along the heart-shaped the heart-shaped cam groove.

The card-retaining mechanism has a pin support embedded in the slider. The pin support has a J-shaped engaging projection at the rear for engagement with a groove formed on a memory card. According to the J-shaped engaging projection of the pin support, a corresponding groove is formed on the slider in order to supply enough space for the J-shaped engaging projection to metamorphose under the pressure of card. The pin support further flexes a pressing support for engagement with the pin member, so that the pin member would not release engagement with the heart-shaped cam groove due to upward movement when it reciprocates in the heart-shaped cam groove.

When operating, firstly, the memory card is put into the front of card-inserting space formed between the case cover and the plastic case. Then, the memory card is put to move forward as the first section operation. At the same time, the memory card is pushed to the memory card retaining position at the back of the card-insertion space by means of reciprocation of the pin member. Simultaneously the memory card is fixedly located in the card-insertion space by the engagement between the J-shaped engaging projection of the pin support and the notch of the memory card. During the second period of pushing memory card forwardly, the memory card is ejected backward from the card retaining position through the reciprocation movement of the pin member and the elasticity of the spring. In the mean while, the J-shaped engaging projection of the pin support deforms elastically to the slider under the pressure of the card, and then gets out from the groove of the card. Then, the engagement between the memory card and the card connector is released. In the end, the memory is taken out from the card-insertion space without any effort.

In the above-mentioned card connector, however, the pin support and the slider are respectively prepared and then assembled. It is difficult to satisfy the need to make a card connector compact and light-weight. Furthermore, only depending on the elasticity of the pin support to engage a notch of the memory card with the J-shaped engaging projection for retaining would cause the memory card to be drawn out from the card connector easily, but to be retained therein difficultly.

U.S. Pat. No. 6,537,090 discloses another card connector with two-stage card ejection mechanism and card-retaining mechanism. The card connector has a guiding portion set on the plastic case body. When a memory card is inserted, a guiding pin guides a retaining elastic pin to slide along. When the retaining elastic pin is elastically deformed, a hook formed at the free end of the retaining elastic pin stretches into a groove on one side of a memory card, so that the memory card is retained in a card inserting space. When the retaining elastic pin restores elasticity, the hook retracts from a groove of the memory card, accordingly, to release the engagement between the memory card and the card connector. When the memory card is repeatedly inserted and extracted by means of the persistent propping of the guiding portion, although the memory card can be reliably retained in the card connector, the stress on the back of the retaining elastic pin connected with the slider is intensive. Additionally, the retaining elastic pin is easy to be distorted due to fatigue, even to release the engagement with the slider, because the retaining elastic pin is separately formed with the slider as a whole.

In addition, the pressing elastic pin used to confine the pin member is not designed as a whole. One pressing elastic pin is cut from the top of the shielding case cover corresponding to the member pin, or a pressing portion is extended from the front of the plastic slider, in order to confine the pin member, accordingly, it is difficult to leave the heart-shaped cam groove. The pressing elastic pin is formed on the top of the shielding case cover. The design makes the slider, the retaining elastic pin and the pressing elastic pin formed respectively. It is difficult to make the card connector compact and light-weight. A pressing portion is extended from the front of the plastic slider, so that it cannot make the card connector compact and light-weight enough due to too large volume. Furthermore, because the engagement between the pressing portion and the pin member is inelastic, it is easy for the pressing portion to release the engagement for the pin member and become ineffective due to fatigue.

Another card connector with tow-stage ejection mechanism and card-retaining mechanism is disclosed in U.S. Pat. No. 6,729,892. A guiding groove is set on one side of the top plain of a shielding case cover, which is another kind of design. A guiding groove extends in the card inserting direction with the width of the guiding groove increasing. The guiding groove comprises a straight border and a flexural border. The straight border is near to a side board of a shielding case cover. The flexural border is far away from the side board. The distance between the front of the flexural border and the side board is smaller than the distance between the back of the flexural border and the side board. Accordingly, a retaining elastic pin is guided to prop along the flexural border. When the retaining elastic pin is not deformed elastically, a memory card is retained in a card inserting space. When the retaining elastic pin is deformed elastically, the memory card is extracted from the card connector. The retaining portion is horizontal to the wide end of a guiding groove. A hook at the end of the retaining elastic pin has enough space to move back along the wide end of the guiding groove, when the retaining elastic pin moves relatively to the memory card due to unexpected circumstances. Accordingly, the retaining elastic pin releases the engagement with the groove of the memory card to make the memory card difficult to be reliably retained. Furthermore, it is possible for the retaining elastic pin to release the engagement with the slider and difficult to make the card connector compact and light-weight.

SUMMARY OF THE INVENTION

In the present invention, a card connector with tow-stage card ejection mechanism and card-retaining mechanism is provided. The card connector comprises a plastic case body, a shielding case cover and a card ejection mechanism therebetween. The plastic case body has a side wall, and sets a heart-shaped cam groove near the side wall. The shielding case cover has a side board for engagement with the side wall of the plastic case body to form a card inserting space. A memory card can be inserted to the card inserting space from the front and stays there. Near to the side board, the shielding case cover has a guiding groove extending from the card inserting direction. The side border adjacent to the side board is a flexural border. The distance between the front of the flexural border and the side board is smaller than the distance between the back of the flexural and the sided board. The two-stage card ejection mechanism includes a pin member. One end of the pin member is movably put in the heart-shaped cam groove of the plastic case body, and another end of the pin member is connected with a slider. A connecting portion connects both ends. The slider is movably engaged with the side wall of the plastic case body. A spring is set between the slider and the plastic case body. One side of the slider is a pressing elastic slice propping the connecting portion of the pin member, and another side of the slider is a support elastic slice extending a guiding arm that stretches into the guiding groove of the shielding case cover and props the flexural border of the guiding groove. The support elastic slice protrudes a supporting part facing to the memory card, and it is on the same axis with the groove set on one side of the memory card.

According to the card connector with two-stage ejection mechanism and card-retaining mechanism of the present invention, the two-stage ejection mechanism further includes a support pin, a spring and a slider that is fixedly connected on one side of the plastic case body.

According to the card connector with two-stage ejection mechanism and memory card-retaining mechanism, the slider has a concave slice with a connecting hole set thereon. One end of the pin member passes through the connecting hole and lies on the concave slice. The top of the other end of the pin member is as high as the slider.

According to the card connector with two-stage ejection mechanism and memory card-retaining mechanism, the support elastic slice is inclined in the opposite direction of the card inserting direction. The supporting pin passing through the spring and the slider. The spring is pressed against one side of the plastic case body.

According to the card connector with two-stage ejection mechanism and memory card-retaining mechanism, the guiding groove has a first straight border far away from the shielding case cover and a second flexural border which comprises a straight border, a flexural border and another straight border.

As the above description, the support elastic slice would become ineffective due to fatigue by means of the connection between the guiding arm of the support elastic slice and the guiding groove of the shielding case cover and the connection between the retaining portion of the support elastic slice and the groove of the memory card. The support elastic slice is also impossible to release the engagement with the slider. Furthermore, when the memory card is located at the retaining position, the guiding arm closely props the outside side border of the guiding groove to make the retaining portion unable to move horizontally and release the engagement with the memory card due to the elasticity of the supporting elastic slice, so that the memory card can be stably and reliably retained in the card connector. The slide, the supporting elastic slice and the pressing elastic slice are formed as a whole, so that the card connector is compact and light-weight and has enough room to accommodate the supporting pin that passes through the spring. In addition, when the memory card is inserted into the card inserting space, the side border of the memory card would not deform due to the friction with the supporting part because the support elastic slice is inclined in the opposite card-inserting direction. Accordingly, the memory card is stably and reliably retained in the card connector. The card connector would become more compact and more light-weight due to the height decrease to the concave slice of the slider.

DETAILED DESCRIPTION OF THE PREFERRED EMBODIMENT

Now, embodiments of the present invention will be described in detail by referring to the accompanying drawings.

Figure 1:
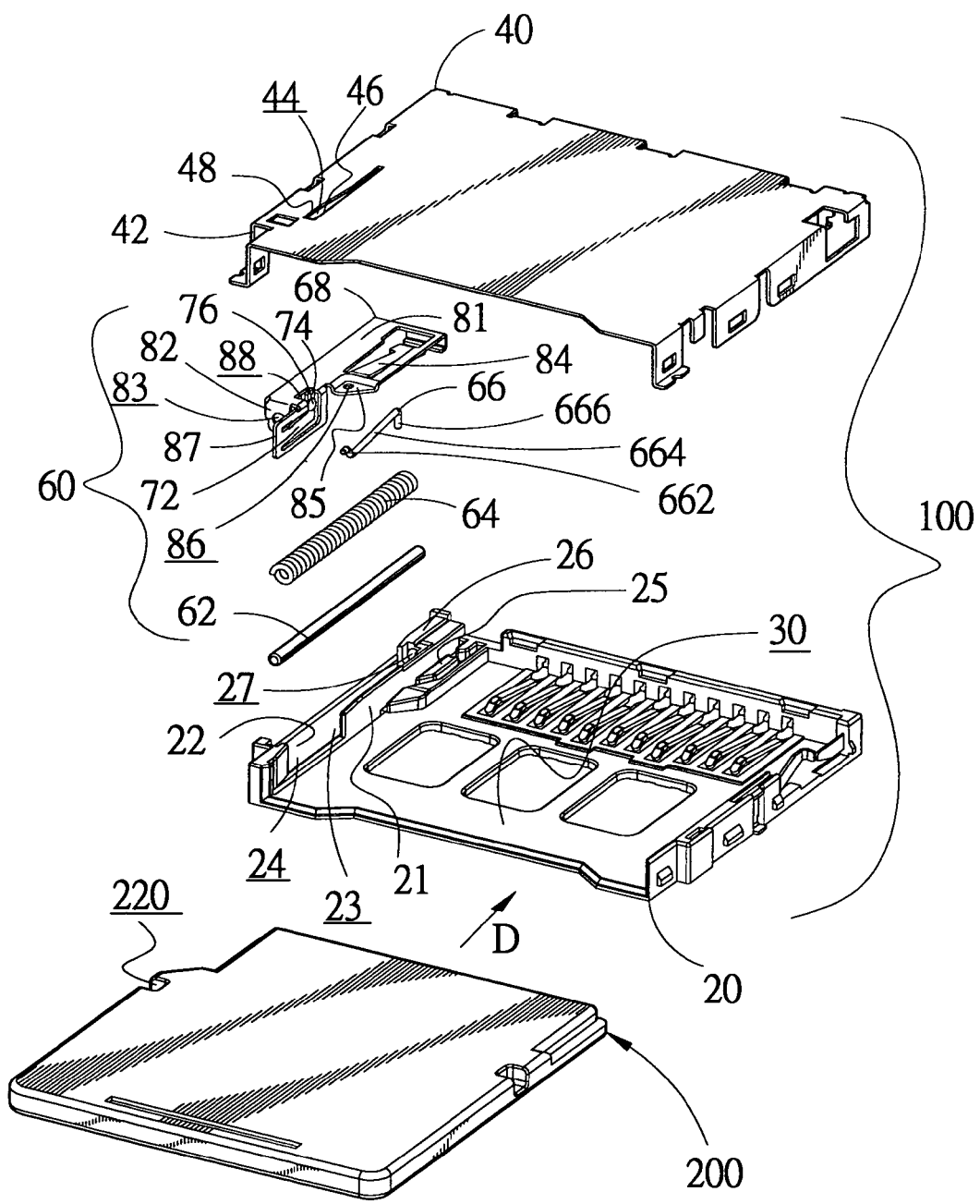
FIG. 1 is an exploded perspective view of a card connector with two-stage card ejection mechanism and card-retaining mechanism of the present invention.

As FIG. 1 illustrated, the present invention provides a card connector that has a two-stage ejection mechanism and a card-retaining mechanism. The card connector 100 comprises a plastic case body 20, a shielding case cover 40 and a two-stage ejection mechanism 60 assembled between the plastic case body 20 and the shielding case cover 40. A card inserting space 30 is formed between the plastic case body 20 and the shielding case cover 40. The plastic case body 20 and the shielding case cover 40 are engaged with each other to form the card inserting space 30. A memory card 200 inserts the card inserting space 30 from the front of the card inserting space 30 in the direction-D and stays therein.

A housing space 23 is formed between a partitioning wall 21 extended from one side of the plastic case body 20 and a side wall 22 of the plastic case body 20. There is a partitioning wall groove 24 in the front of the partitioning wall 21. A heart-shaped cam groove 25 on the plastic case body 20 is shaped as a whole in the card inserting space 30 near to the partitioning wall 21. A housing block 26 is extended from the back wall of the plastic case body 20 towards the housing space 23. A housing hole 27 is formed in the front of the housing block 26.

A side board 42 is extended from one side of the shielding case cover 40 for engagement with the side wall 22 of the plastic case body 20. Corresponding to the side wall 22, the shielding case cover 40 has a guiding groove 44 that tapers in the direction of D. The guiding groove 44 has a first side border 46 and a second side border 48. The first side border 46 far from the side board 42 is a straight border, and the second side border 48 near to the side board 42 is a flexural boarder that is connected by a straight board, a flexural board and another straight board in the direction D.

Figure 4:
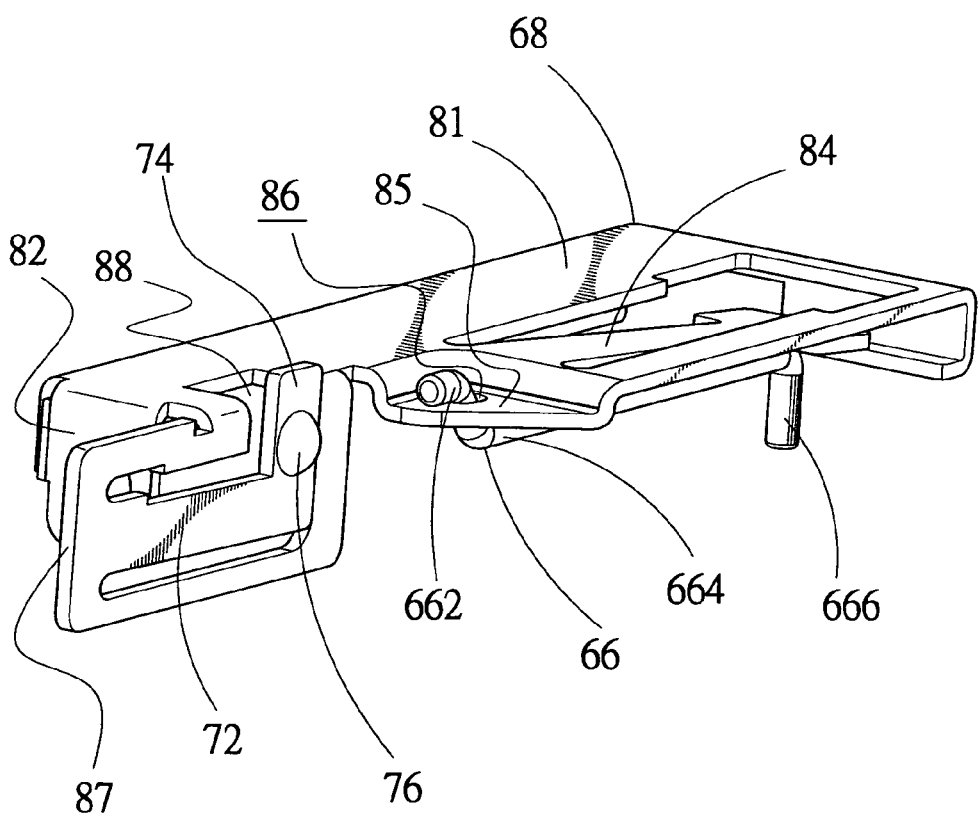
FIG. 4 is a perspective view showing an assembled slider and a pin member.

Referring to FIGS. 1 and 4, the two-stage ejection mechanism 60 of the card connector 100 comprises a support pin 62, a spring 64, a pin member 66 and a slider 68. One end of the pin member 66 is a fixed portion 662. The other end of the pin member 66 is a movable portion 666. A connecting portion 664 connects the fixed portion 662 and the movable portion 666. The slider 68 has a plain board 81. A sliding slice 82 is flexed from the front of the plain board 81 and has a sliding hole 83 thereon. The diameter of the sliding hole 83 is larger than the outside diameter of the support pin 62 and less than the inside diameter of the spring 64, so that the support pin 62 passes through the sliding hole 83 and the spring 64 props the sliding slice 82. On the other side of the slider 68, a pressing elastic slice 84 is formed on the back portion of the slider 68 and inclines downwards. The middle part of the slider 68 extends a concave slice 85 having a connecting hole 86 extended downwardly at the middle portion of the slider 68. A support arm 87 is downwardly flexed at the front portion of the slider 68. The support arm 87 is nearly perpendicular to the sliding slice 82. The center of the support arm 87 is empty. In the card inserting direction, the front of the support arm 87 extends a support elastic slice 72 of which a free end extends upwardly a guiding arm 74. A withdrawing groove 88 is arranged on the plain board 81 corresponding to the guiding arm 74 for receiving the guiding arm 74 therein. The support elastic slice 72 inclines a little in order to make the guiding arm 74 to stretch into the withdrawing groove 88. The guiding arm 74 extends a supporting part 76. The support elastic slice 72 deviating from the card inserting space 30 with small-angel inclination. The side boarder would not deform to be ineffective due to the fraction with the supporting part 76, when the memory card 200 is put into the card inserting space 30.

Figure 2:
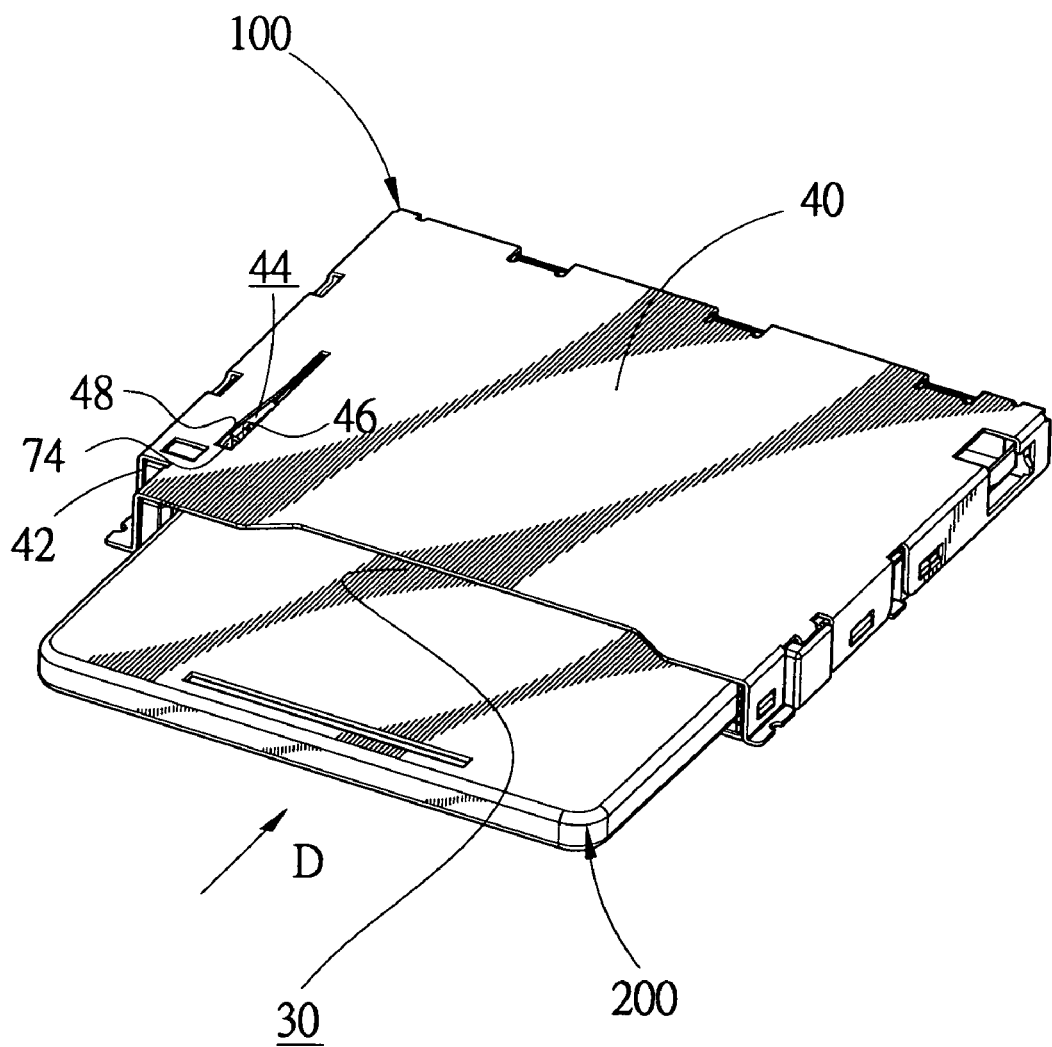
FIG. 2 is a perspective view of the card connector with two-stage card ejection mechanism and card-retaining mechanism.
Figure 3:
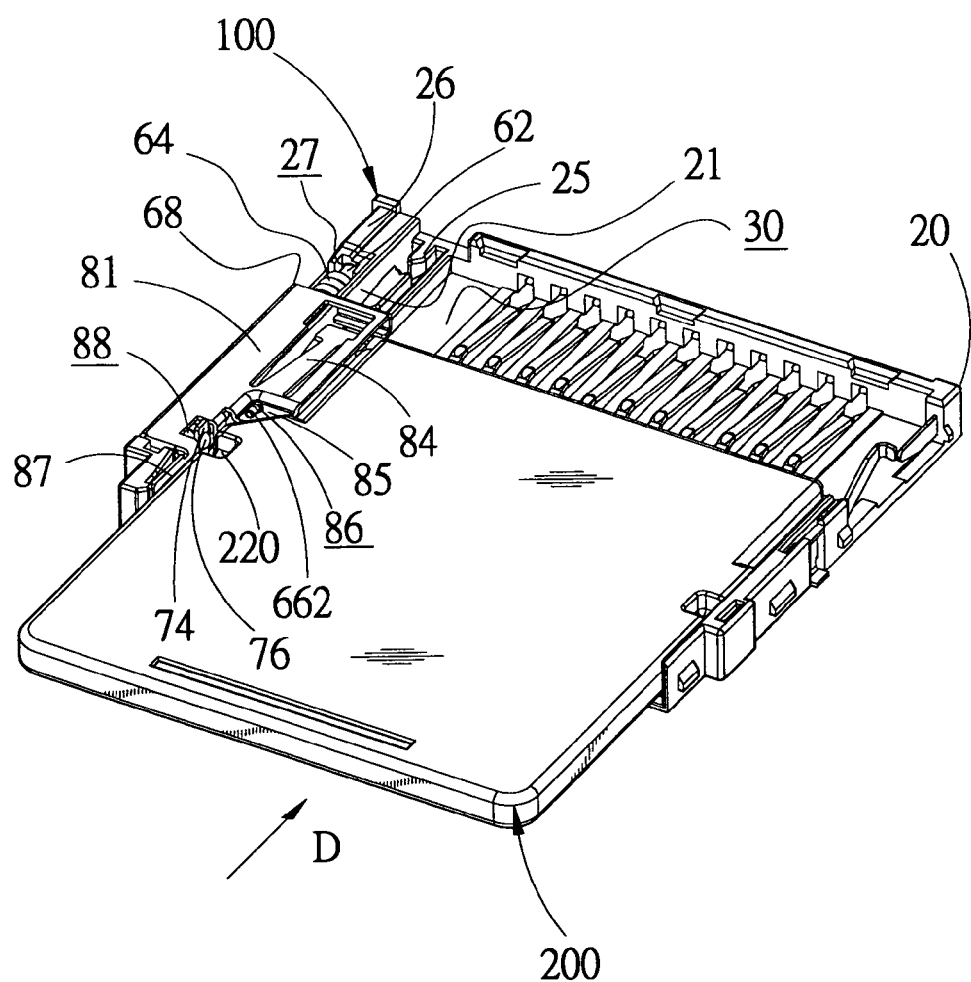
FIG. 3 is a perspective view of the card connector with two-stage card ejection mechanism and card-retaining mechanism shown in FIG. 2 with the shielding case cover removed.

Please refer to FIGS. 2 and 3, When assembling, the slider 68 is slidable engaged with the partitioning wall 21 and the side wall 22 of the plastic case body 20. The support arm 87 is located in the partitioning wall groove 24. The sliding slice 82 is located in the housing space 23. The guiding arm 74 stretches up to the guiding groove 44 of the shielding case cover 40 and props the flexural border. By means of the tapered design along the guiding groove 44, enough space is provided for the guiding arm 74 to be easily assembled with the guiding groove 44. One end of the support pin 62 is embedded in the housing hole 27, and the other end passes through the sliding hole 83 of the sliding slice 82 and props the front of the plastic case body 20. The spring 64 encompasses the support pin 62 and is elastically accommodated in the housing space 23 by use of the housing block 26 propping and stopping action. The fixed portion 662 of the pin member 66 passes through the connecting hole 86 of the slider 68 and lies on the concave slice 85. The top of the fixed portion 662 is as high as the top plain of the slider 68 in order to reduce the height of the slider 68 and to make the card connector compact and light-weight. The movable portion 666 of the pin member 66 is movably accommodated in the heart-shaped cam groove 25. The pressing elastic slice 84 props the connecting portion 664. When moves back and forth in the heart-shaped cam groove 25, the movable portion 666 always props the pressing elastic slice 84, so that the engagement between the movable portion 666 and the heart-shaped cam groove 25 would not be released due to jumping.

During operating, firstly, the memory card 200 is put into the front of the card inserting space 30 to prepare for the first-stage push action. In the mean while, the supporting part 76 of the slider 68 is horizontal to the groove 220 set on one side of the memory card 200. And then, in the direction of card inserting direction D, the memory card 200 is pushed to start the first push action. At the same time, through the reciprocating movement of the pin member 66 in the heart-shaped cam groove 25, the memory card 200 can be inserted into the card-retaining place, which is in the back of the card inserting space 30. During the first phrase of the push operation, the slider 68 moves in the card-inserting direction D and the guiding arm 74 of the slider 68 props the flexural border 48 of the guiding groove 44. When the guiding arm 74 propping the first straight border of the flexural border 48, the supporting part 76 keeps the initial distance with the memory card 200 to move together with the groove 220 of the memory card 200. When the guiding arm 74 propping the inclined border of the flexural border 48, the guiding arm 74 leads the support elastic slice 72 to metamorphose elastically to the memory card 200 in order to make the supporting part 76 to be embedded gradually into the groove 220. When the guiding arm 74 propping the last straight border of the flexural border 48, the supporting part 76 is always kept in the groove 220. At the end of the first operation, the memory card 200 is retained at the card-retaining location in the back of the card inserting space 30. Finally, along the card-inserting direction D, the memory card 200 is pushed forward as the second push action. In the mean while, the memory card 200 can be ejected by means of the reciprocating movement of the pin member 66 in the heart-shaped cam groove 25 and the elasticity of the spring 64. During the second push operation, the guiding arm 74 of the slider 68 still props the flexural border 48 of the guiding groove 44 and exits together with the memory card 200. The support elastic slice 72 goes far away from the memory card 200 gradually from the elastic state to the inelastic state for retracting the supporting part 76 from the groove 220 of the memory card 200 and releasing the engagement between the memory card 200 and the card connector 100, so that the memory card 200 can be ejected from the card inserting space 30 easily.

As the above description, the support elastic slice 72 is not easy to become ineffective due to fatigue by means of the connection between the guiding arm 74 and the guiding groove 44 and the connection between the retaining portion 76 and the groove 220. The support elastic slice 72 is also impossible to release the engagement with the slider 68. Furthermore, when the memory card 200 is located at the retaining position 76, the guiding arm 74 closely props the outside side border of the guiding groove 44 to make the retaining portion 76 unable to move horizontally and release the engagement with the memory card 200, due to the elasticity of the support elastic slice 72, so that the memory card 200 can be stably and reliably retained in the card connector 100. In the mean while, the slider 68, the support elastic slice 72 and the pressing elastic slice 84 are formed as a whole, so that it makes the card connector 100 compact and light-weight and has enough space to accommodate the support pin 62 that passes through the spring 64.

Finally, the card connector with two-stage card ejection mechanism and card-retaining mechanism of the invention has disclosed the relative art in detail through the above embodiment and relative drawings. The present invention has been described in detail with respect to preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A card connector with two-stage ejection mechanism and card-retaining mechanism comprising:

a plastic case body having a side wall with a heart-shaped cam groove near to the side wall;

a shielding case cover having a side board for engagement with the side wall of the plastic case body to form a card inserting space, wherein a memory card is inserted and stays at the back of the card inserting space, a guiding groove being set near to the side board on the shielding case cover and stretching along the card inserting direction, a flexural border being near to the side border of the side board, and the distance from the side board to the front of the flexural border being smaller than the distance to the back of the flexural border; and a two-stage ejection mechanism and a card-retaining mechanism being set between the plastic case body and the shielding case cover, the two-stage ejection mechanism and card-retaining mechanism comprising a pin member, one end of the pin member being movably put in the heart-shaped cam groove, another end of the pin member being linked with a slider, the both ends being connected by a connecting portion, the slider being slidably engaged with the side wall of the plastic case body, a spring being configured between the slider and the plastic case body, a pressing elastic pin being formed on one end of the slider propping the connecting portion of the pin member, a retaining elastic pin being formed on the other end of the slider, a guiding arm being extended from the retaining elastic pin upwardly to stretch into the guiding groove of the shielding case cover and prop the flexural border of the guiding groove, a retaining portion being extended from the retaining elastic pin toward the memory card, the groove set on one side of the memory card being on the same axis with the retaining portion.

2. The card connector with two-stage ejection mechanism and card-retaining mechanism according to claim 1, wherein the slide has a concave slice, a connecting hole being set on the concave slice, one end of the pin member passing through the connecting hole and lying on the concave slice, the top of one end of the pin member being horizontal to the surface of the slider.

3. The card connector with two-stage ejection mechanism and card-retaining mechanism according to claim 1, wherein the retaining elastic pin inclines in the opposite card inserting direction.

4. The card connector with two-stage ejection mechanism and card-retaining mechanism according to claim 1, wherein the side border of the side board of the shielding case cover is a straight border, the flexural border of the guiding groove being sequentially linked by a straight border, a flexural border and another straight border.

5. The card connector with two-stage ejection mechanism and card-retaining mechanism according to claim 1, wherein the two-stage ejection mechanism further comprises a supporting pin, a spring, and a slider, the supporting pin passing through the spring and the slider, the spring being pressed against one side of the plastic case body.

6. The card connector with two-stage ejection mechanism and card-retaining mechanism according to claim 5, wherein the slier has a plain board, a slidable pin being flexed downward from the front of the plain board, thereon a sliding hole is set, the diameter of the sliding hole being smaller than the inner diameter of the spring and larger than the diameter of the supporting pin, the supporting pin being in the spring which props the slidable pin.

* * * * *